United States Patent [19]

Soleau, Jr.

[11] 4,135,490
[45] Jan. 23, 1979

[54] RECIRCULATING NATURAL CONVECTION SOLAR ENERGY COLLECTOR

[76] Inventor: Bertrand S. Soleau, Jr., 4203 Kincaid Ct., Chantilly, Va. 22021

[21] Appl. No.: 750,444

[22] Filed: Dec. 14, 1976

[51] Int. Cl.² ............................................... F24J 3/02
[52] U.S. Cl. ....................................... 126/270; 126/271
[58] Field of Search ................ 126/270, 271; 237/1 A

[56] References Cited

U.S. PATENT DOCUMENTS

| 2,202,756 | 5/1940 | Cline | 126/271 |
|---|---|---|---|
| 2,553,073 | 5/1951 | Barnett | 126/271 |
| 2,680,437 | 6/1954 | Miller | 126/270 |
| 3,841,302 | 10/1974 | Falbel | 126/270 |
| 3,919,998 | 11/1975 | Parker | 126/270 |
| 3,939,818 | 2/1976 | Hamilton et al. | 126/271 X |
| 3,987,782 | 10/1976 | Meier, Jr. | 126/271 |
| 4,005,583 | 2/1977 | Ramey | 126/271 X |

FOREIGN PATENT DOCUMENTS 257348   4/1949   Fed. Rep. of Germany ........... 126/271

Primary Examiner—William F. O'Dea
Assistant Examiner—Larry Jones
Attorney, Agent, or Firm—Witherspoon, Lane & Hargest

[57] ABSTRACT

Recirculating natural convection solar energy collectors are disclosed. In one species of the invention, the collector comprises an insulated housing, a cover of glass or other suitable transparent material, a transparent plate of glass or other suitable material mounted inside said housing and spaced apart from the cover, a heat absorber mounted inside the housing and spaced apart from the transparent plate, an air separator mounted inside the housing and spaced apart from the absorber and cover, and a heat exchanger located inside the housing at the top of the housing. The heat absorber is made from a thin sheet of suitable material such as aluminum foil that has a surface coated with a heat absorbing material such as black paint, solar selective black chrome and the like. As the air inside the housing flows over the heat absorber, it is heated and rises to the top of the housing. The heat exchanger at the top of the housing absorbs heat from the hot air thereby cooling the air. The cooler air flows downward through a cool air return channel and then again flows over the absorber to be heated. In this manner a continuous air flow is maintained with the heat exchanger absorbing useful heat from the air. In a second species of the invention, a second plate made of glass or other suitable transparent material is mounted between the transparent plate and the heat absorber. A variation of the two main species is also disclosed. In this variation, a small blower is mounted in the bottom of the housing to assist the air flow.

16 Claims, 7 Drawing Figures

RECIRCULATING NATURAL CONVECTION SOLAR ENERGY COLLECTOR

BACKGROUND OF THE INVENTION

The invention relates to solar energy collectors and, more particularly, to recirculating natural convection solar energy collectors.

The concept of utilizing the sun as a source of energy is an old and well known concept. While this is an old and well known concept, interest in this field has been somewhat limited until the recent energy crisis. The recent energy crisis has generated a great deal of activity in the field of solar energy and many different types of solar collectors have been developed recently and are now available on the market. Of course, various different types of solar collectors were developed and marketed prior to the energy crisis.

In a considerable number of these prior art solar collectors, a flowing liquid is in thermal contact with an absorber which absorbs the heat from the sun. The flowing liquid absorbs heat from the absorber of the collector and flows from the collector to a point where the heat is utilized. The liquid is then pumped back to the collector where it is again in thermal contact with the absorber of the collector and is again heated. In this prior art type of collector the liquid, which may be water, may merely flow over the top of the absorber plate. The water is heated as it flows over the absorber and the temperature of the water is reduced at its point of use and its temperature again raised as it flows back over the collectors. There are, of course, many variations of this type of collector. For example, a black dye has been added to the water in some prior art systems and in others liquids other than water are used. In still other variations, the liquid flows through pipes or closed channels that are integral with the associated plate.

Another type of prior solar collector that has been developed is commonly called a focusing collector. Focusing collectors have some means of focusing the sun's rays on the absorber of the collector. For example, many of the prior art focusing collectors use a generally parabolic shaped focusing element. In such systems, the absorber is generally a pipe containing a flowing liquid.

In addition to the two common types of prior art solar collectors described above, a few solar collectors in which the air in the collector is heated by the absorber have been devised. In such systems, the air flows past the absorber and is heated. The air with its thermal energy is delivered to its point of use where the heat may be extracted. Many of these prior art air systems use a blower to move the air. In a few other such air systems, the natural convection currents caused by the heating and cooling of the air is relied upon to circulate the air in the collector. These air type solar collectors offer some advantages over collectors utilizing fluids. For example, a minimum of corrosion resistant material is needed in an air type collector and generally these air type collectors are generally simpler in design and, therefore, less expensive than the conventional liquid type collectors. While such air type collectors have been designed, all of the prior art air type collectors of which the applicant has knowledge have complex absorber plate arrangements, or have absorber plate arrangements that tend to reduce the air flow rate in the collector. Examples of such prior art air type solar collectors are disclosed in U.S. Pat. Nos. 2,553,073; 3,875,925, and 3,939,818.

The solar energy collectors of this invention are air flow type collectors that are so designed as to maximize air flow in the collector by natural convection. Further, the solar collectors of this invention are relatively simple in design and, therefore, relatively inexpensive to construct.

SUMMARY OF THE INVENTION

The basic solar collectors of this invention comprise an enclosed housing having a cover plate made of glass or other suitable material. The housing is made of wood or other suitable material having good heat insulating properties. The inside of the housing is lined with a suitable heat insulating material such as a spun or foam glass or the like. A second plate made of glass or other suitable transparent material is secured inside the housing and is spaced apart from the cover plate. A heat absorber is also secured inside the housing. This heat absorber is located beneath and spaced apart from the second glass plate. The heat absorber may be made from any suitable thin material such as aluminum foil that has been painted black or coated with some other suitable heat absorbing material. An air separator plate is also secured inside the housing. The air separator plate is located beneath the heat absorber and is spaced apart from the absorber. A heat exchanger is secured inside said housing at the top of the housing.

In a second species of the invention, a third transparent plate of glass or other suitable transparent material is secured inside the housing between the second plate and the heat absorber.

In both the basic solar collectors of this invention and in the second species described above, the collector utilizes the natural convection of the air contained inside the collector to obtain useful heat energy. The heat absorber absorbs heat from the sun. As the air flows over and around the heat absorber, the air is heated by the heat absorber. The less dense heated air flows to the top of the collector and, therefore, to the heat exchanger which is located at the top of the collector. The heat exchanger extracts heat from the air and, therefore, reduces the temperature of the air. This relatively cooler more dense air flows toward the bottom of the collector, through the air return channels and then back up over and around the heat absorber, where it is again heated by the heat absorber, and then rises to the top of the collector where heat is again extracted by the heat exchanger. Thus, there is a continuous flow of the air through the collector due to the heating and cooling of the air. The collector is so designed as to permit a free flow of the air through the collector passages by the natural convection caused by this heating and cooling of the air.

While the collectors of this invention are primarily designed to operate on natural convection of the air in the collector, there may be instances where a more rapid flow of air is desired. In such cases a blower can be placed in the bottom of the collectors of this invention. However, the collectors of this invention are designed to operate on the natural convection of the air in the collector and, therefore, the use of a blower is not preferred.

BRIEF DESCRIPTION OF THE DRAWING

A complete understanding of the structural details and nature of operation of the invention can be obtained from the following detailed description of the invention when read in conjunction with the annexed drawings in which.

DETAILED DESCRIPTION OF THE INVENTION

Figure 1:
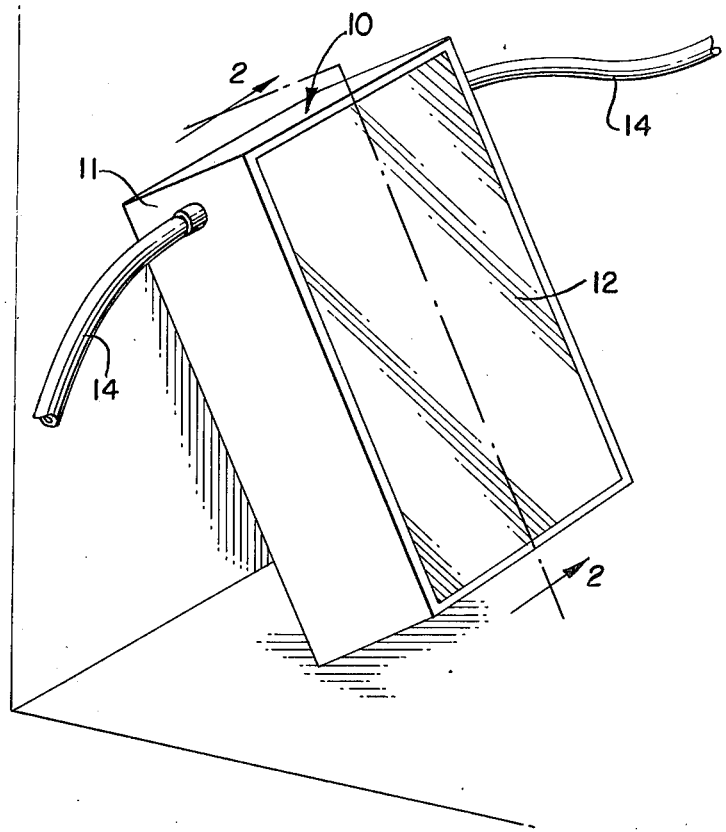
FIG. 1 is an isometric view of a solar collector constructed in accordance with this invention.

FIG. 1 shows the general overall preferred configuration of the solar collectors of this invention. As shown in FIG. 1, the solar collector 10 comprises an outer housing 11 that is made of wood or any other rigid material. For appearance, housing 11 will normally be painted. As shown, housing 11 is generally rectangular in shape but could also be square or irregular shaped. Housing 11 is constructed as a container that is closed on all sides except the front. The front of housing 11 is covered by a transparent plate 12 that is secured to the front of housing 11 by means of mechanical fasteners and/or glue. Transparent plate 12 may be a glass plate or a plate made of suitable transparent plastic. In areas prone to vandalism, a suitable plastic that is highly resistant to breakage is preferred over glass. Transparent plate 12 extends across the entire top surface of housing 11. Instead of being placed across the top of housing 11, transparent plate 12 could be recessed slightly below the top surface of housing 11. As will become apparent, a heat exchanger that utilizes fluid as the heat exchange medium is located in the top of housing 11. The fluid is carried from housing 11 and returned to housing 11 by means of the conduits 14 which may be heat insulated pipes or flexible hoses.

As shown in FIG. 1, solar collector 10 is preferably deployed in a tilted fashion such that transparent plate 12 tilts upward toward the sun. Further, as will become apparent, housing 11 must be so oriented that the top end of housing 11 is always at a higher elevation than the opposite end of housing 11 and that the end of collector 10 containing the heat exchanger is always the top end of collector 10.

Figure 2:
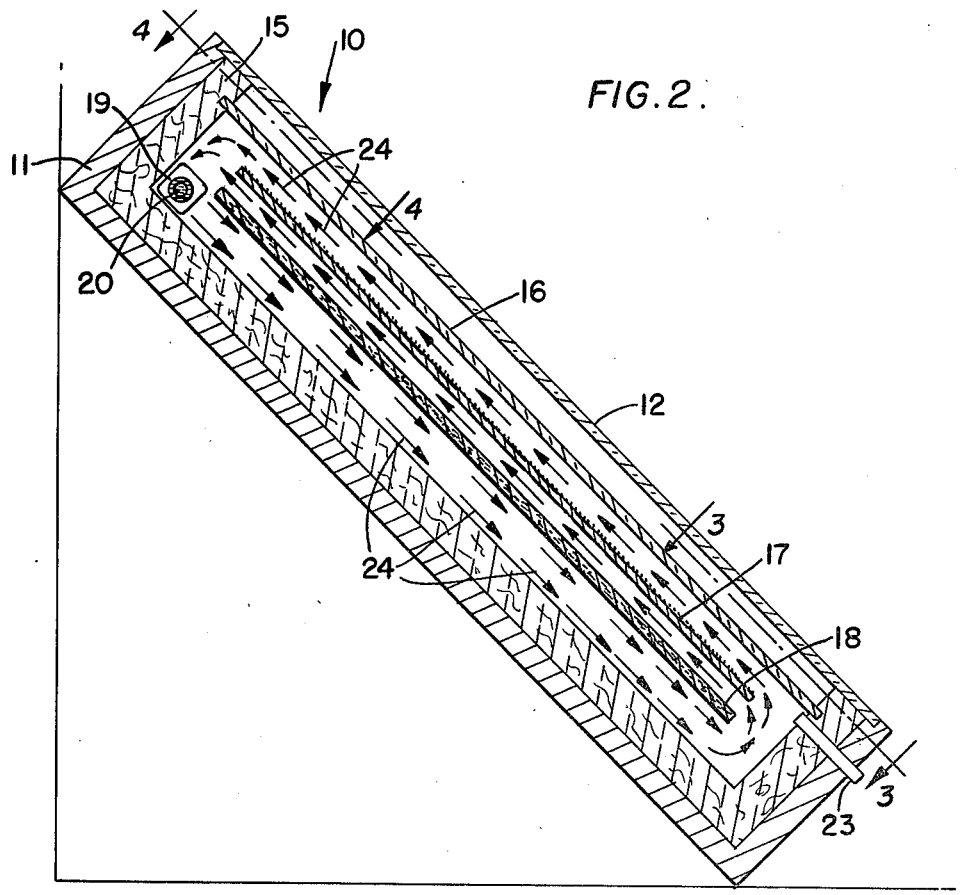
FIG. 2 is a longitudinal cross-section view of the collector of FIG. 1 showing the details of the collector.

Referring to FIG. 2, this figure is a longitudinal cross-section of collector 10 of FIG. 1 and shows the structural details of a preferred embodiment of the solar collector of this invention. As shown in FIG. 2, the inside of housing 11 is lined with a heat insulating material 15. Material 15 may be made of any suitable heat insulating material but should be made of a material that does not out-gas when its temperature is raised. An example of a suitable insulating material for insulation 15 is pure spun or foam glass. A second transparent plate 16 made of glass or other suitable material is secured inside housing 11 beneath cover plate 12. Plate 16 is not absolutely necessary but is preferred since the inclusion of this plate minimizes heat loss from inside housing 11. Heat loss is minimized by the inclusion of plate 16 since the space between cover plate 12 and plate 16 is a dead air space.

The absorber plate 17 is secured inside housing 11 and is spaced below transparent plate 16. Absorber plate 17 may be made of any suitable thin material such as aluminum foil. Absorber plate 17 can be made of a very thin material since this plate does not support any weight except its own. As will become apparent, the ability to use a thin absorber plate has some advantages. Absorber plate 17 is coated with a suitable heat absorbing material such as black paint, black chrome or the like. An air flow separator plate 18 is secured inside housing 11 below and spaced apart from absorber plate 17.

Figure 4:
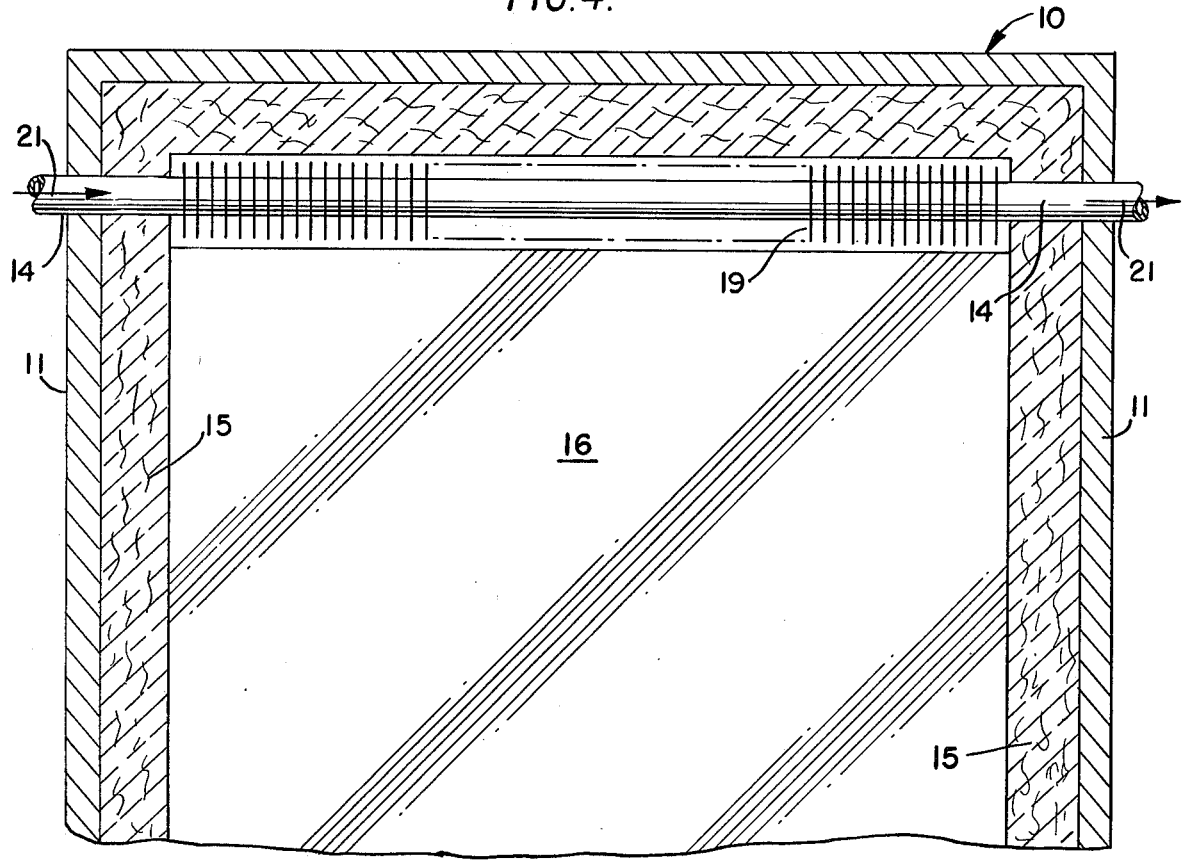
FIG. 4 is a partial cross-section view of the top front of the collector of FIG. 1 taken along the line 4—4 of FIG. 2.
Figure 5:
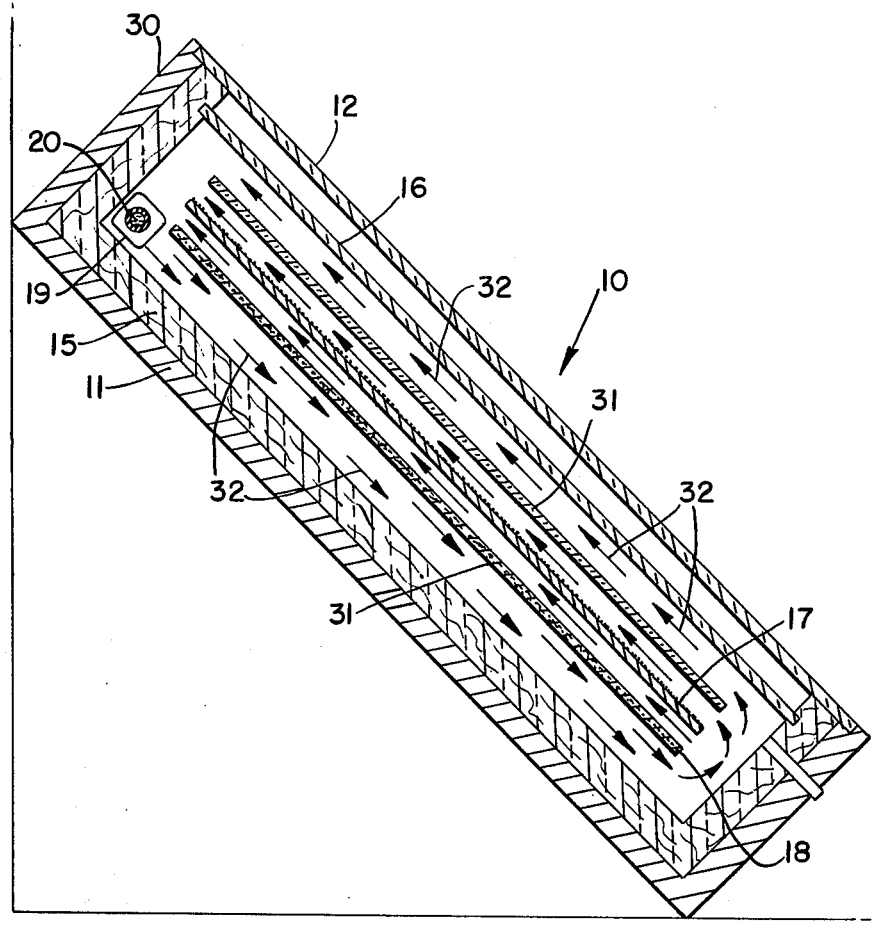
FIG. 5 which is a cross-section view equivalent to the cross-section view of FIG. 2 shows a second embodiment of the collector of this invention.

A heat exchanger 19 is housed inside the top of housing 11. Heat exchanger 19 is preferably a finned tube as shown in FIG. 4. The finned tube of heat exchanger 19 carries a working fluid 20 (FIGS. 2 and 5). Working fluid 20, which may be water, flows into and out of heat exchanger 19 through the conduits 14. Which of the conduits 14 is the inlet and which is the outlet, of course, depends upon the direction in which fluid 20 is flowing. In FIG. 4, conduit 14 on the left is the inlet and conduit 14 on the right is the outlet as is illustrated by the fluid flow arrows 21. The direction of flow could just as well be in the other direction.

Transparent plate 16, absorber plate 17 and air flow separator plate 18 extend across the full width of collector 10 and are secured to the sides of housing 11 by any suitable means such as mechanical fasteners and/or glue. Grooves may be cut on the inside of each side of housing 11 with the various plates 16, 17 and 18 slipped in the grooves and then permanently secured in the grooves by the use of a heat resistant glue or these plates may merely rest inside the grooves without being secured in the grooves. In the case of absorber plate 17, however, the plate should be supported by small blocks (not shown) so arranged as not to obstruct air flow if absorber plate 17 is made from a very thin material, such as aluminum foil, so that it will not bow downward.

Figure 3:
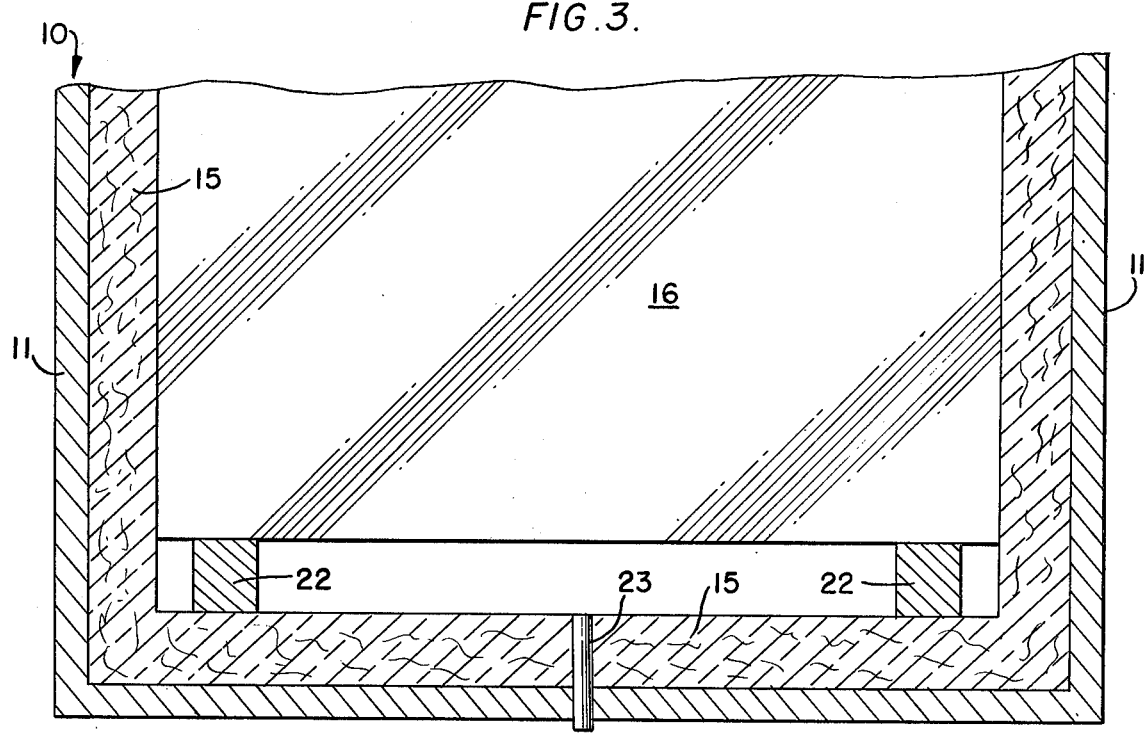
FIG. 3 is a partial cross-section view of the bottom front of the collector of FIG. 1 taken along line 3—3 of FIG. 2.

In order that air can flow over heat exchanger 19, absorber plate 17 and air flow separator 18 must be shorter than housing 11, as shown in FIG. 2. Absorber plate 17 and air flow separator plate 18 will be held in the position shown in FIG. 2 if they are secured to the sides of housing 11. However, in order to provide additional support for plates 17 and 18, the support blocks 22 are provided at the bottom of collector 10, as shown in FIG. 3. Absorber plate 17 and air flow separator plate 18 can merely rest on support blocks 22 or may be glued to support blocks 22. In this arrangement, the top edge of absorber plate 17 and the top edge of air flow separator plate 18 are not supported. The top edge of these plates need not be supported since plates 17 and 18 do not carry any weight except their own weight. In fact, if absorber plate 17 and air flow separator 18 are firmly secured to the sides of housing 11, support blocks 22 are not absolutely necessary. However, the use of support blocks 22 is preferred. An optional vent 23 passing through the bottom of housing 11 into the collector 10 may be provided. Vent 23, which may have a one-way valve, is optimally provided to prevent the build up of excessive pressure inside collector 10. Normally, excessive pressures should not be present; however, in order to protect against such excessive pressures, vent 23 will normally be provided.

Referring again to FIG. 2, solar collector 10 operates in the following manner: Air flow and the direction of this air flow inside collector 10 is indicated by the arrows 24. As the air flows over the top surface of absorber plate 17 between transparent plate 16 and under absorber plate 17 between air flow separator 18 and absorber plate 17, the air is heated by absorber plate 17. Absorber plate 17 is heated by the sun's rays which pass through cover plate 12 and transparent plate 16. As is well known, the hotter and, therefore, less dense air will flow toward the top of collector 10 and come in contact with heat exchanger 19. Heat exchanger 19 extracts heat from the air passing over it and, thereby, raising the temperature of working fluid 20 inside heat exchanger 19 and reducing the temperature of the air. The cooler more dense air will then flow downward in back of air flow separator 18 and then back past absorber plate 17 to be heated again. During this time, working fluid 20 is continuously circulating through heat exchanger 19 carrying the heat away from collector 10 to the point where the heat is utilized. The air inside collector 10 will continuously flow in the direction of arrows 24 by the natural convection currents caused by this heating and cooling of the air. The air inside collector 10 can be raised to a substantially high temperature but will nevertheless continue to flow because of the temperature differential between the air heated by absorber plate 17 and the air cooled by heat exchanger 19.

FIG. 5 shows a collector 30 which, except for the addition of the glass plate 31, is identical to collector 10 of FIG. 2; therefore, all the parts of collector 30 that are identical to the equivalent parts of collector 10 have the same reference numerals in FIGS. 2 and 5 and will not be described in detail with reference to FIG. 5, since these parts are all mounted in the same manner in both collectors 10 and 30, function in the same manner, and are fabricated out of the same materials. Plate 31 is preferably a glass plate that extends across the full width of housing 11 and is either mounted in the sides of housing 11 in grooves provided in the sides or merely glued to the sides of housing 11 by a suitable high temperature resistant glue. If grooves are provided, glass plate 31 can rest freely in the grooves but is preferably secured in the grooves by the use of a suitable high temperature resistant glue. If support blocks 22 are provided, the bottom edge of glass plate 31 rests on support blocks 22. Glass plate 31 may merely rest on support blocks 22 or may be secured to support blocks 22. As is the case with absorber plate 17 and air flow separator 18, the top edge of glass plate 31 is unsupported.

Collector 30 operates in essentially the same manner in which collector 10 operates. In FIG. 5, the air flow and direction of this flow is indicated by the arrows 32. As is the case in collector 10, the air flows under absorber plate 17 and over absorber plate 17 and is heated by absorber plate 17. However, in collector 30 the air flows over absorber plate 17 and between glass plate 31 and absorber plate 17 instead of between absorber plate 17 and transparent plate 16. In addition, in collector 30, the air flows over the top of glass plate 31 between transparent plate 16 and glass plate 31. The air flowing in between absorber plate 17 and glass plate 31 is heated by both absorber plate 17 and glass plate 31 and the air flowing over the top of glass plate 31 is heated by glass plate 31. Glass plate 31 absorbs some heat from the sun and absorbs most of the long wavelength radiation emitted from absorber plate 17, thereby causing its temperature to increase. Therefore, glass plate 31 provides additional heating surfaces to heat the air and reduces radiative heat loss from the collector.

As is the case in collector 10, the heated air inside collector 30 rises to the top of collector 30 and flows over heat exchanger 19 and is cooled. This relatively cooler air flows downward under air flow separator 18 then upward between air flow separator 18 and absorber plate 17, between absorber plate 17 and glass plate 31 and between glass plate 31 and transparent plate 16 where it is again heated so that it will flow upward and over heat exchanger 19. Thus, as is the case in collector 10, the air in collector 30 is continuously circulated through collector 30 by the natural convection currents generated by the heating and cooling of the air.

Figure 6:
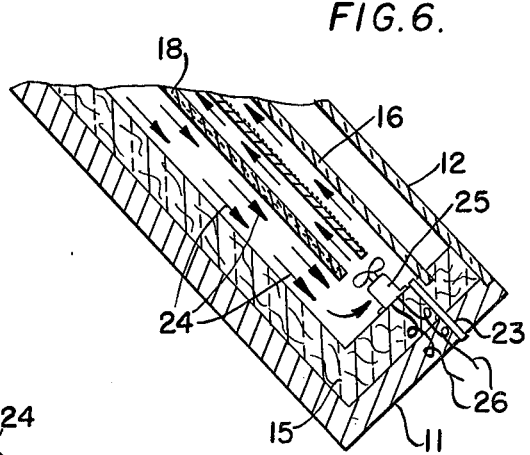
FIG. 6 which is a cross-section view equivalent to FIG. 3 shows an optional blower that may be used in the collectors of this invention.

FIG. 6 shows a portion of the bottom part of collector 10 of FIG. 2. If more rapid air flow than is provided by natural convection is desired, a small blower such as circulating fans 25 may be secured inside the bottom of either collector 10 or collector 30 generally in the area shown in FIG. 6. The electrical leads 26 are brought out through housing 11 to provide operating power to circulating fans 25. Collectors 10 and 30 operate in a completely satisfactory manner without the use of blower or circulating fans 25 and, therefore, the use of such a fan is not necessary and is not, in fact, preferred.

Figure 7:
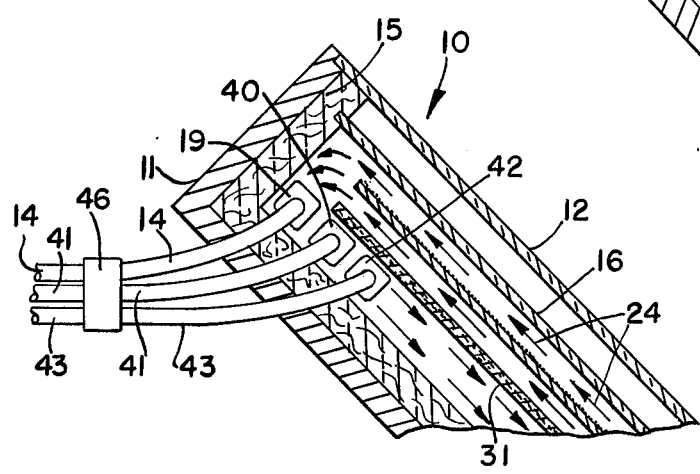
FIG. 7 which is a partial view of the cross-section view of FIG. 2 shows an alternate heat exchanger arrangement that may be used in the collectors of this invention.

FIG. 7 shows a portion of the top part of collector 10 of FIG. 2 with modification of the heat exchanger structure. Instead of the single heat exchanger 19 shown in FIGS. 2 and 3, a plurality of heat exchangers can be used in collectors 10 and 30 as shown in FIG. 7. In FIG. 7, two additional heat exchangers, the heat exchangers 40 and 42, are added to collector 10 in the position shown in FIG. 7. The conduit 41 is connected to heat exchanger 40 to carry working fluid 44 associated with heat exchanger 40 either to or away from heat exchanger 40, depending upon the direction of flow of working fluid 44. Similarly, the conduit 43 is provided with heat exchanger 42 to carry working fluid 45 associated with heat exchanger 42 either away from or toward heat exchanger 42, depending upon the direction of flow of working fluid 45. While only two additional heat exchangers are shown, any number of such additional heat exchangers can be provided. In addition, a valve system 46 can be utilized if more than one heat exchanger is provided. Valve system 46 operates to cut in one, two or any number of the heat exchangers provided. That is, valve system 46 cuts off or turns on the flow of the working fluid of each of the heat exchangers. If only one heat exchanger is needed at a particular time, valve system 46 is operated to cut off the fluid flow in all but one of the heat exchangers. As additional heat exchangers are desired or required, valve system 46 is operated to turn on the fluid flow of these additional heat exchangers.

From the foregoing description of the solar collectors of this invention, it should be obvious that the solar collectors of this invention are relatively simple in design, provide maximum air flow rate by natural convection, are relatively inexpensive to manufacture and simple to operate. Further, the solar collectors of this invention can be deployed or mounted at any suitable place or location. For example, a plurality of the collectors of this invention can be mounted in the roof of a house having a peak or slanted roof and thereby form a part of the roof structure, or can be mounted in the walls of a house between the joists. Other additional advantages of the system will be apparent to those skilled in the art.

In both of the disclosed embodiments of the invention, the collector is shown and described as including the plate 16. This plate 16 can actually be omitted in both emodiments. In areas having warm climates, plate 16 is not essential; however, in areas having temperate climates, plate 16 should be provided to minimize heat losses from the collector and in areas having cold climates, plate 16 is essential since without plate 16 the heat losses in such colder climates could become excessively large if plate 16 were not provided. In fact, in areas having very cold climates, an additional cover plate spaced slightly below cover plate 12 could be provided to further minimize heat losses from the collector. Also the heat exchanger 19 and the heat exchangers 40 and 42 are described as being finned tubes such as shown in FIG. 4. This finned tube arrangement provides a very satisfactory heat exchanger arrangement for the collectors of this invention. However, other known fluid carrying heat exchangers can also be obviously used in the collectors of this invention. In addition, more than one small blower 25 can be provided (if such blowers are provided) and these blowers can be located at any appropriate convenient plate inside said housing. However, as stated previously, such blowers are not needed and are, therefore, not preferred.

While the invention has been described in detail with reference to two specific embodiments, it will be obvious to those skilled in the art that various modifications and changes other than those specifically disclosed and shown in the drawings can be made to either of the two specific embodiments without departing from the spirit and scope of the invention as set forth in the claims.

I claim:

1. An air convection solar collector comprising:
   a housing having a front side, a back side wall, a first side wall, a second side wall, a top side wall and a bottom side wall, said back side wall, said first side wall, said second side wall, said top side wall and said bottom side wall being secured together in such a manner that said housing is closed on all said sides except the front side, said front side being open;
   a plate made of a suitable solar transparent material. said plate being secured to said top side wall, said bottom side wall, said first side wall and said second side wall in such a manner that said plate forms a wall for said front side and thereby closes said open front side of said housing;
   a layer of insulating material secured inside said housing such that said layer of insulating material covers all sides of said housing except said front side;
   a solar absorber plate shorter in length than the length of said housing, said solar absorber plate being secured inside said housing in such a position that said solar absorber plate is spaced apart from said plate and from said layer of insulating material covering said top side wall of said housing and is spaced apart from said layer of insulating material covering said bottom side wall of said housing;
   an air flow separator plate shorter in length than the length of said housing, said air flow separator plate being secured inside said housing in such a position that said air flow separator is spaced apart from said solar absorber plate and from said layer of insulating material covering said back side wall of said housing and is spaced apart from said layer of insulating material covering said top side wall of said housing and is spaced apart from said layer of insulating material covering said bottom side wall of said housing; and
   a single heat exchanger secured inside said housing adjacent to said layer of insulating material covering said top side of said housing and adjacent to said layer of insulating material covering said back side of said housing.

2. An air convection solar collector as defined in claim 1 wherein said solar absorber plate is a thin sheet of suitable material coated with a solar absorbing material.

3. An air convection solar collector as defined in claim 2 wherein said plate is made of glass.

4. An air convection solar collector as defined in claim 2 wherein said single heat exchanger is a finned tube containing a liquid and wherein insulated conduits pass through said housing and are secured to said heat exchanger to transport said fluid to and from said heat exchanger.

5. An air convection solar collector as defined in claim 4 wherein said thin sheet of suitable material is a sheet of aluminum foil coated with said solar absorbing material.

6. An air convection solar collector as defined in claim 5 wherein said solar absorbing material is black paint.

7. An air convection solar collector as defined in claim 5 wherein said solar absorbing material is a solar selective material.

8. An air convection solar collector as defined in claim 1 wherein a second plate made of a suitable solar transparent material is secured inside said housing between said plate and said solar absorber plate.

9. An air convection solar collector as defined in claim 8 wherein a third plate made of a suitable solar transparent material is secured inside said housing, said third plate being shorter in length than the length of said housing and being so positioned in said housing that it is located between said second plate and said solar absorber plate and is spaced apart from said layer of insulating material covering the top side wall of said housing and is spaced apart from said layer of insulating material covering the bottom side wall of said housing.

10. An air convection solar collector as defined in claim 9 wherein said third plate is made of glass.

11. An air convection solar collector as defined in claim 8 wherein said second plate is made of glass.

12. An air convection solar collector as defined in claim 1 wherein a pressure relieving vent is cut into said housing.

13. An air convection solar collector as defined in claim 1 wherein a plurality of heat exchangers in addition to said single heat exchanger are secured inside said housing, said plurality of heat exchangers being positioned between said air flow separator and said layer of insulating material covering the back side of said housing.

14. An air convection solar collector as defined in claim 13 wherein said single heat exchanger and each one of said plurality of heat exchangers is a finned tube containing a liquid and wherein separate insulated conduits are secured to both sides of said single heat exchanger and to both sides of each one of said plurality of heat exchangers to transport said fluid contained in said single heat exchanger and in each one of said plurality of heat exchangers to and away from all of said heat exchangers.

15. An air convection solar collector as defined in claim 14 wherein said separate insulated conduits of all of said heat exchangers are coupled to a valve system, said valve system including means to selectively cut-off and turn-on the flow of liquid to each one of all of said heat exchanger.

16. An air convection solar collector as defined in claim 1 wherein at least one small blower is secured inside said housing.

* * * * *